United States Patent [19]

Davatz et al.

[11] Patent Number: 4,667,928
[45] Date of Patent: May 26, 1987

[54] SHUT-OFF VALVE WITH SPHERICAL PLUG

[75] Inventors: Kaspar Davatz, Chur; Bruno Hilpert, Diessenhofen; Bruno Hunziker, Schaffhausen, all of Switzerland

[73] Assignee: Georg Fischer Aktiengesellschaft, Switzerland

[21] Appl. No.: 862,678

[22] Filed: May 13, 1986

[30] Foreign Application Priority Data

May 13, 1985 [CH] Switzerland ................. 2033/85

[51] Int. Cl.$^4$ ............................................. F16K 5/06
[52] U.S. Cl. ................................. 251/315; 251/148; 251/316; 251/360; 137/327
[58] Field of Search .............. 251/148, 315, 316, 360; 137/315, 327

[56] References Cited

U.S. PATENT DOCUMENTS

| | | | |
|---|---|---|---|
| 4,059,250 | 11/1977 | Guldener et al. | 251/315 X |
| 4,327,895 | 5/1982 | Blumenbrantz et al. | 251/315 |
| 4,418,887 | 12/1983 | Tularu | 251/315 X |

Primary Examiner—A. Michael Chambers
Assistant Examiner—John C. Fox
Attorney, Agent, or Firm—Toren, McGeady and Goldberg

[57] ABSTRACT

A shut-off valve assembly includes a housing which has a spherical plug arranged in a chamber. The housing has an internal thread into which a support element for a sealing member is screwed. On the outer end face of the support element is supported a flange bushing by means of a retaining nut. The pitches of the internal thread and of an external thread for the retaining nut are directed in opposite directions, so that the support element cannot be loosened when the retaining nut is unscrewed.

7 Claims, 3 Drawing Figures

SHUT-OFF VALVE WITH SPHERICAL PLUG

BACKGROUND OF THE INVENTION

1. Field of the Invention

The present invention relates generally to a shut-off valve with a spherical plug, and more particularly to a shut-off valve assembly having a housing which defines a chamber and has at its two ends external threads. Retaining nuts for holding flange bushings are screwed onto the external threads. Sealing members are arranged on both sides of the spherical plug, wherein at least on one side the sealing member is mounted on a support element which is screwed into an internal thread of the housing. At least one flange bushing has sealing contact with the outer end of the support element facing away from the plug.

2. Description of the Prior Art

A shut-off valve of the above-described type is known from DE-C2-3044201. When the retaining nut is unscrewed in the valve of this type, turning of the flange bushing causes a screwed-in part to be simultaneously turned, particularly due to the great play of the thread, so that the sealing member is lifted from the spherical plug and the shut-off valve is no longer tight. This may be dangerous particularly when the shut-off valve is used with aggressive media. The shut-off valve is therefore only usable to a limited extent.

It is, therefore, the primary object of the present invention to provide a shut-off valve of the afore mentioned type which affords a tight sealing action even when a flange bushing at the outlet side is unscrewed and the connected pipe is loosened.

In accordance with another object of the invention, the sealing action of the spherical plug is to be self-tightening within a certain range in case of wear.

SUMMARY OF THE INVENTION

In accordance with the present invention, the internal thread for the support element for the sealing member has a pitch which is directed in the opposite direction of that of the external thread for the retaining nut.

As a result of the oppositely directed pitches of the internal thread for the support element for the sealing member and the external thread for mounting the retaining nut on the housing, the support element cannot move away from the spherical plug even when the support element rotates together with the retaining nut when the retaining nut is unscrewed, so that the shut-off valve remains tightly sealed even when the pipe on the outlet side is removed.

In accordance with another feature of the invention, the threads are trapezoidal threads which is advantageous with respect to the manufacture by injection molding and provides excellent properties with respect to movement and strength. The internal thread for the support element is advantageously a left-handed thread.

In accordance with yet another feature of the invention, round rubber rings are provided between one sealing member and the support element and between the other sealing member and the housing. In addition, an annular groove provided in the support element affords an advantageous resiliency of the support element, so that the sealing elements for the spherical plug can be pretensioned and, consequently, the sealing action of the sealing members is maintained even after wear of the sealing members.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DETAILED DESCRIPTION OF THE INVENTION

Figure 1:
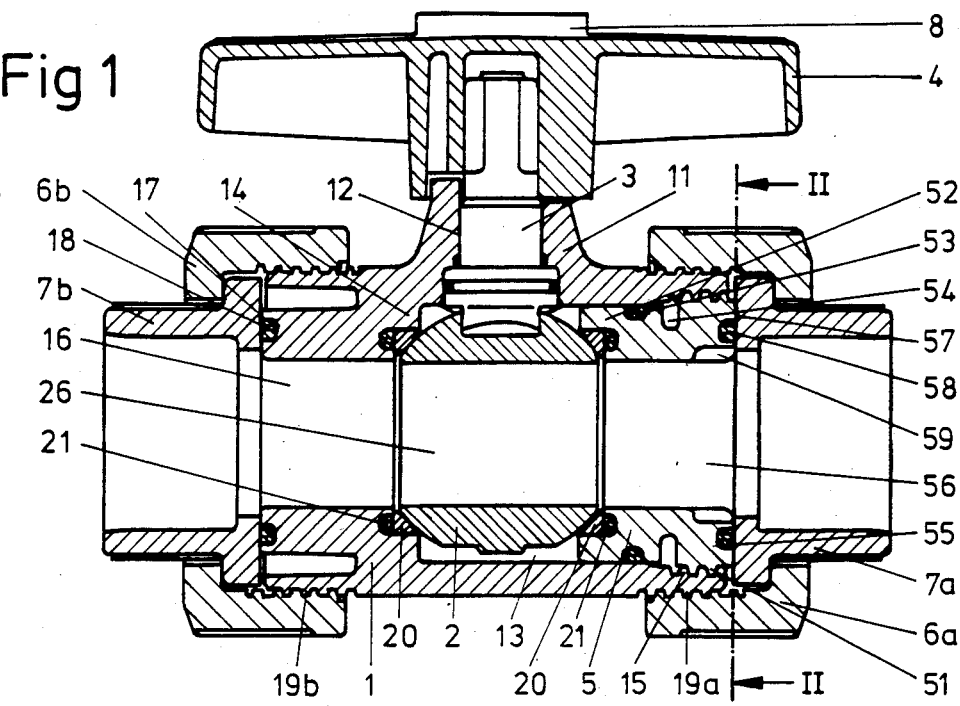
FIG. 1 is a sectional view of a valve in accordance with the present invention.

As illustrated in the drawing, the valve according to the present invention includes a housing 1 which has a tubular projection 11 which defines a bore hole 12. In bore hole 12 is rotatably mounted a spigot 3. A handle 4 is placed on and connected to the end of spigot 3 which extends out of projection 11.

The housing further has a cylindrically shaped chamber 13 in which a spherical plug 2 is arranged. Plug 2 is in engagement with the end of spigot 3 which extends into the chamber 13, so that plug 2 can be rotated by means of handle 4 through spigot 3. Sealing members 20 are provided on both sides of plug 2 so as to contact plug 2. One sealing member 20 is arranged on a recess 14 of housing 1 and the other sealing member 20 is arranged on a support element 5.

Support element 5 has an external thread 51 which engages an internal thread 15 at the outer end of chamber 13, so that the support element 5 is screwed into housing 1 until the sealing members 20 make contact with plug 2. Round rubber rings 21 are provided between one sealing member 20 and support element 5 and between the other sealing member 20 and recess 14. When the support element 5 is screwed in, the rubber rings 21 are compressed, so that they press the sealing members 20 against the plug 2 in a prestressed condition.

Support element 5 has a through bore 56 and a cylindrical portion 52, with a sealing ring 53 provided on the outer circumference of cylindrical portion 52. An annular groove 54 is provided on the outer circumference of the support element 5 between the cylindrical portion 52 and the external thread 51. The depth of groove 54 is at least one third, preferably up to one half, of the annular thickness of the support element 5. As a result, cylindrical portion 52 is resilient in such a way that when the support element 5 is tightened by means of external thread 51, sealing member 20 is still pressing against spherical plug 2 even when the sealing member is worn.

The outer end 55 of support element 5 extends out of housing 1. A sealing ring 58 is arranged in an angular groove formed in end face 57 of the support element 5.

Housing 1 has external threads 19a and 19b, respectively, at its two ends. A retaining nut 6a holding a flange bushing 7a is screwed onto thread 19a. A retaining nut 6b holding a flange bushing 7b is screwed onto thread 19b. The flanges of flange bushings 7a and 7b are directed inwardly toward plug 2. Flange bushing 7a rests sealingly against end face 57 of support element 5 and flange bushing 7b rests sealingly against an end face 17 of housing 1 provided with a sealing ring 18.

Through bore 56 of support element 5 and through bore 16 arranged on the other side of housing 1 and, in the position of plug 2 illustrated in FIG. 1, a through bore 26 of plug 2 form a continuous opening for flow of a medium through the valve. The flow of the medium is stopped when the plug 2 is turned by 90 degrees.

Figure 2:
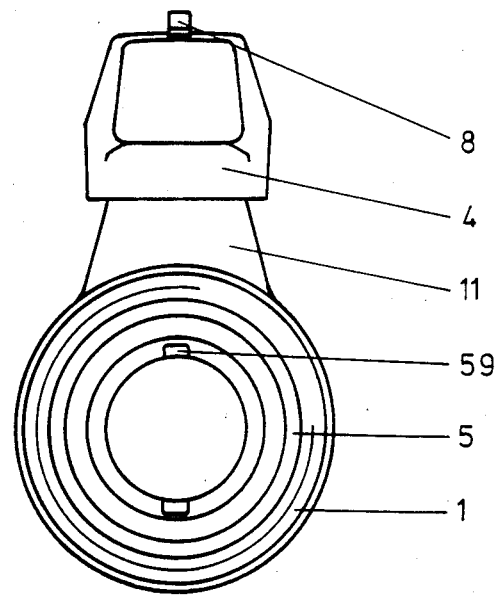
FIG. 2 is a front elevational view of the valve of FIG. 1, from Line II—II with omitted retaining nut and flange bushing.
Figure 3:
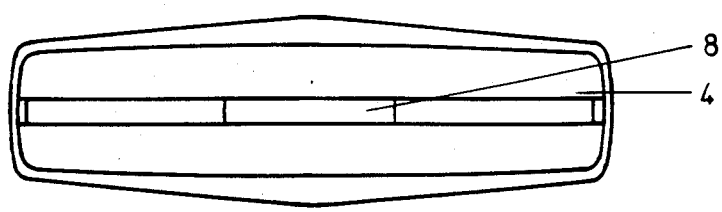
FIG. 3 is a top view of the hand lever of the valve.

For screwing the support element 5 into the housing, the element 5 has on its end face 55 two oppositely located recesses 59, as illustrated also in FIG. 2. The removable handle 4 may serve as a screwing tool. For this purpose, it has on its upper side a web 8 which, as can be seen from FIG. 3, has such a length and width that it can be inserted into the two recesses 59, so that the support element 5 can be rotated by means of handle 4.

The pitch of the internal thread 15 and the pitch of the external thread 19 are oppositely directed. For example, the external thread 19 intended for the retaining nuts 16 may have a conventional right-handed pitch and the internal thread 15 intended for the support element 5 may have a left-handed pitch. Both threads may be trapezoidal threads which provide the necessary play for manufacture and assembly.

In order to be able to use the shut-off valve in accordance with the invention for aggressive media, its parts are manufactured, for example, from polyvinyl chloride which is resistant to these media. Most parts, even the threads, can be manufactured by injection molding without requiring subsequent mechanical machining.

The shut-off valve according to the invention may also have a symmetrical configuration, that is, it may have support elements for sealing members on both sides of the plug. In that case, both support elements are screwed into the housing with threads which have opposite pitches from the threads intended for the retaining nuts.

While the specific embodiment of the invention has been shown and described in detail to illustrate the application of the inventive principles, it will be understood that the invention may be embodied otherwise without departing from such principles.

We claim:

1. Shut-off valve assembly comprising a tubular valve housing having first and second ends and defining a chamber, a spherical valve plug rotatable within the chamber, the first and second ends having external threads, retaining nuts arranged for securing flange bushings screwed onto the external threads, the tubular valve housing having an axis, sealing members arranged on both sides of the plug in the axial direction, an internal thread provided at least at one of the first and second ends of the housing, a support element for a sealing member screwed into the internal thread, wherein at least one flange bushing rests sealingly against an outer end face of the support element, the improvement which comprises that the internal thread for the support element has a pitch which is directed in the opposite direction of that of the external thread for the retaining nut.

2. Shut-off valve assembly according to claim 1, wherein the internal thread is a left-handed thread and the internal thread and the external thread are trapezoidal threads.

3. Shut-off valve assembly according to claim 1, comprising round rubber rings for generating a pretensioning condition between one sealing member and the support element and between the other sealing member and the housing.

4. Shut-off valve assembly according to claim 1, wherein the support element has a cylindrical portion and defines an annular groove on its outer circumference between the external thread and the cylindrical portion.

5. Shut-off valve assembly according to claim 4, wherein the support member is annular and the annular groove has a depth which is at least one third of the annular thickness of the support element.

6. Shut-off valve assembly according to claim 4, wherein the support member is annular and the annular groove has a depth which is up to one half of the annular thickness of the support element.

7. Shut-off valve assembly according to claim 1, wherein the support element has at its end facing away from the plug two oppositely located recesses, a handle for rotating the plug defining a web on its side facing away from the plug, wherein the recesses are formed so that the web can be inserted therein.

* * * * *